United States Patent
Janowiak et al.

(10) Patent No.: US 10,406,973 B2
(45) Date of Patent: Sep. 10, 2019

(54) LIGHTED AUTO VISOR MIRROR

(71) Applicant: Irvin Automotive Products, LLC, Pontiac, MI (US)

(72) Inventors: Anthony R. Janowiak, Rochester, MI (US); Andrew Joseph Wieczorek, Holly, MI (US); Martin J. Rathsburg, Jr., Clarkston, MI (US); Leslie Hinds, Oxford, MI (US); John Gerald Nowakowski, Harrison Township, MI (US); Mark Anthony Schuetz, New Albany, OH (US)

(73) Assignee: IRVIN AUTOMOTIVE PRODUCTS, LLC, Pontiac, MI (US)

( * ) Notice: Subject to any disclaimer, the term of this patent is extended or adjusted under 35 U.S.C. 154(b) by 45 days.

(21) Appl. No.: 15/420,176

(22) Filed: Jan. 31, 2017

(65) Prior Publication Data

US 2017/0217365 A1  Aug. 3, 2017

Related U.S. Application Data

(60) Provisional application No. 62/289,490, filed on Feb. 1, 2016.

(51) Int. Cl.
*B60Q 3/252* (2017.01)
*B60Q 3/60* (2017.01)
*B60J 3/02* (2006.01)
*B60Q 3/51* (2017.01)

(52) U.S. Cl.
CPC ............ *B60Q 3/252* (2017.02); *B60J 3/0282* (2013.01); *B60Q 3/51* (2017.02); *B60Q 3/60* (2017.02)

(58) Field of Classification Search
None
See application file for complete search history.

(56) References Cited

U.S. PATENT DOCUMENTS

| | | |
|---|---|---|
| 4,364,597 A | 12/1982 | Viertel et al. |
| 4,744,645 A | 5/1988 | Sharp |
| 4,751,618 A | 6/1988 | Iacovelli |
| 4,830,424 A | 5/1989 | Svensson |
| 5,267,090 A | 11/1993 | Dowd et al. |
| 5,278,736 A | 1/1994 | Falcoff et al. |
| 5,906,424 A | 5/1999 | Peterson |
| 6,464,381 B2 | 10/2002 | Anderson, Jr. et al. |
| 6,499,868 B1 | 12/2002 | Kerul, Jr. |
| 6,871,990 B2 | 3/2005 | Imazcki et al. |
| 7,032,949 B1 | 4/2006 | Wang et al. |
| 7,036,965 B2 | 5/2006 | Dalton, Jr. et al. |
| 7,201,427 B2 | 4/2007 | Wang et al. |
| 7,534,018 B2 | 5/2009 | Nicola et al. |

(Continued)

*Primary Examiner* — Britt D Hanley
(74) *Attorney, Agent, or Firm* — Raggio & Dinnin, P.C.

(57) ABSTRACT

A visor for use in a vehicle is disclosed. The visor comprises a pivot rod and a first and second shell being engagable to form a visor body. The visor also comprises a vanity and a mirror having at least one clear portion arranged at or near an end thereof. The visor also comprises a circuit board secured to the first shell and a light emitting diode secured to a surface of the circuit board. The visor also comprises a ramp arranged in a back surface of the mirror wherein the ramp is aligned with at least one clear portion of the mirror. The visor mirror having a ramp arranged therein may allow for light to be redirected towards the user of the mirror from the LED.

20 Claims, 9 Drawing Sheets

(56) References Cited

U.S. PATENT DOCUMENTS

| | | |
|---|---|---|
| 7,559,667 B2 | 7/2009 | Holderman |
| 7,780,322 B2 | 8/2010 | Muller et al. |
| 7,862,220 B2 | 1/2011 | Cannon et al. |
| D643,951 S | 8/2011 | Cai |
| 8,096,688 B2 | 1/2012 | Kino et al. |
| 8,215,810 B2 | 7/2012 | Welch et al. |
| 8,408,773 B2 | 4/2013 | Judge |
| 8,425,094 B2 | 4/2013 | Stakoe et al. |
| 8,596,803 B2 | 12/2013 | Schultz et al. |
| 8,608,355 B2 | 12/2013 | Bruhnke et al. |
| 9,110,200 B2 | 8/2015 | Nichol |
| 9,186,962 B2 | 11/2015 | Huff |
| 9,193,298 B2 | 11/2015 | Huelke |
| 9,195,095 B2 | 11/2015 | Medendorp, Jr. et al. |
| 9,200,781 B2 | 12/2015 | Hudson et al. |
| 2011/0136063 A1* | 6/2011 | Nottola .................. G02B 6/42 430/321 |
| 2014/0362595 A1* | 12/2014 | Marcos Primo ....... B60J 3/0226 362/492 |

\* cited by examiner

LIGHTED AUTO VISOR MIRROR

This application claims benefit of U.S. Provisional Patent Application No. 62/289,490, filed on Feb. 1, 2016

BACKGROUND OF THE INVENTION

1. Field of the Invention

The present invention generally relates to a sun visor for interior use in a vehicle, and more particularly relates to a sun visor, having a visor body that includes a vanity having a light emitting diode.

2. Description of Related Art

Sun visors are well known and widely used in the prior art. Many different types and designs have been successfully employed in vehicles over the years. Many of these prior art visors have been developed in a variety of ways through which visor bodies and other interior components may be constructed and mounted within a vehicle. Advances in design may often add complexities to the manufacturing processes for interior components. There has been and continues to be a premium in the automotive industry on cost savings, weight reduction, and improvements in the efficiency and speed in the manufacturing processes for such components therein. One area of particular focus in the automobile technology field has been reducing the number and the complexity of steps and parts required to assemble interior components such as sun visors or visors for use in a vehicle.

Some prior art visor designs use a clam shell which allows for a visor body to be constructed relatively quickly and easily, however, the various components that are attached to the visor clamshell halves must in some cases be incorporated with several assembly steps prior to securing the clamshell halves together. For example, several known designs require insertion of additional mounting or journaling pieces for retention of the visor pivot rod within the visor body. The construction of visors having such a design is relatively time-intensive. Moreover, the various slides, journals, retainers, etc., utilized in the construction may add significant expense and weight to the overall visor, along with unwanted noise and increase the number of components necessary to build a visor. Many of these prior art visors use standard light bulbs, such as incandescent bulbs to provide light for either a vanity which includes a mirror arranged within the visor or for a map light that is sometimes arranged within the visor. The use of the incandescent bulb draws more current and power than that of newer technologies, such as a LED bulb.

In some prior art visors, eliminating parts may reduce the expense of manufacturing and constructing the visor. Decreasing size and weight, however, can be accompanied by decreases in strength. Furthermore, the visors that attempt to change well accepted technology, like incandescent light bulbs with new technology, such as a LED, may run into problems with consumers and users of the vehicle not accepting the look and feel of the light emitted by an LED versus that of a light emitted by an incandescent prior art light bulb. The use of new technology, such as a LED over a prior art light bulb, may increase the efficiency and reduce manufacturing assembly times for visors in the automotive and other vehicular art. Many of these prior art visors use a lighted mirror that contains two light bulbs, generally one on the left side and one on the right side of the mirror so that the person's face is illuminated when they look into the mirror. Hence, it is desirable in the art to provide a visor that is light weight, easy to manufacture and uses relatively few components, yet utilizes a design imparting significant durability to withstand heavy and repeated use and to provide a solid construction with tight tolerances throughout the entire system. Furthermore, there is a need in the art for an improved visor that has a LED lighted vanity and/or map light arranged therein. There also is a need in the art for a sun visor that uses a variety of methods of aligning a LED with a mirror that has an integrated light guide therein. There also is a need in the art for a mirror that may include either one or two LED's arranged therewith and to be used in conjunction with an integral or internal light guide of the mirror to provide a more even appearance and distribute the light in a more aesthetic pleasing manner than prior art light bulbs. There also is a need in the art for a vanity that may use one light to light both sides of a vanity mirror through the use of an internal or integral light guide system arranged within the body of the mirror along with at least one ramp arranged within the body of the mirror.

SUMMARY OF THE INVENTION

One object of the present invention may be that it provides an improved visor.

Another object of the present invention may be that it provides a visor that has a light emitting diode for use in illuminating a mirror of a vanity.

Yet a further object of the present invention may be that it provides a visor that uses a LED as a direct replacement for a prior art light bulb.

Still another object of the present invention may be that it provides a visor that uses a LED as the light source in conjunction with a mirror having a light guide integrated within a body thereof.

Still another object of the present invention may be that it provides a visor that includes a mirror having at least one ramp arranged in a back surface thereof for redirecting light towards the user of the vanity mirror.

Still another object of the present invention may be that it provides a visor that includes a wire arranged between a circuit board and the electrical system of the vehicle to provide LED lighting in a visor vanity.

Still another object of the present invention may be that it provides a visor that is easier to manufacture and more efficient through the use of a LED lighted vanity.

Still another object of the present invention may be that it provides a visor that is more robust and includes a lighting system that is more reliable and longer lasting than prior art lighting systems.

Yet another object of the present invention may be that it provides a visor that has a mirror that allows light to enter its edge and travel across the plane of the mirror by total internal reflection.

Still another object of the present invention may be that it provides a visor having an LED and mirror that has clear ends arranged at or near one or both ends thereof.

According to the present invention, the foregoing and other objects and advantages are obtained by a novel design for a visor for use in a vehicle. The visor generally comprises a pivot rod and a first and second shell being engagable to form a visor body. The visor also comprises a vanity and a mirror having at least one clear portion arranged at or near an end thereof. The visor also comprises a circuit board secured to the first shell and a light emitting diode secured to a surface of the circuit board. The visor also comprises a ramp arranged in a back surface of the mirror, wherein the ramp is aligned with the at least one clear portion of the mirror in order to redirect light from within the mirror toward the user of the vanity mirror.

One advantage of the present invention may be that it provides for an improved visor.

A further advantage of the present invention may be that it provides for a visor that uses a LED as the light source for a vanity.

Yet another advantage of the present invention may be that it provides for a direct replacement of a prior art light bulb with a LED arranged on a circuit board for a vanity in a visor.

Yet another advantage of the present invention may be that it provides for a mirror having an integral or internal light guide arranged within a body thereof such that light from the LED may enter one end of the mirror and pass across the entire length and plane of the mirror.

Still another advantage of the present invention may be that it provides a visor that uses a LED in conjunction with a mirror to provide illumination for a vanity via ramps arranged in a back surface of the mirror.

Still another advantage of the present invention may be that it provides a visor that replaces prior art light bulbs with more energy efficient, reliable and longer lasting LED light sources.

Still another advantage of the present invention may be that it provides for a visor that is easier to manufacture and more robust than prior art visors.

Yet another advantage of the present invention may be that it provides for a visor that uses a LED in conjunction with a mirror having at least a clear end on one or both ends thereof to illuminate the mirror and the user of the vanity mirror.

Still another advantage of the present invention may be that it provides a visor that uses either one or two LED's to provide illumination for a mirror in a vanity of a visor.

Other objects, features and advantages of the present invention will become apparent from the subsequent description and appended claims, taken in conjunction with the accompanying drawings.

BRIEF DESCRIPTION OF THE EMBODIMENT(S)

Figure 1:
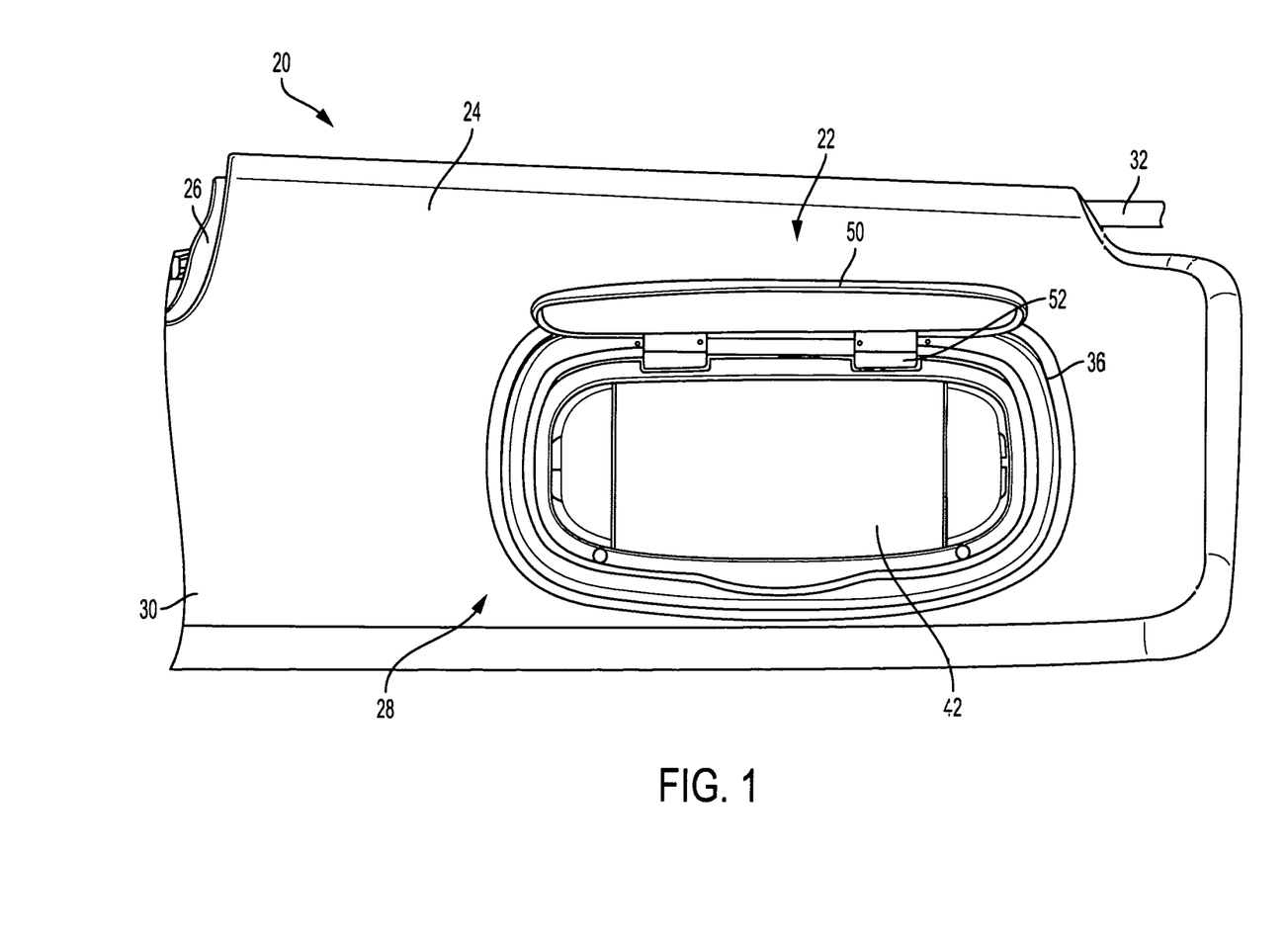
FIG. 1 shows a plan view of a visor according to the present invention.
Figure 2:
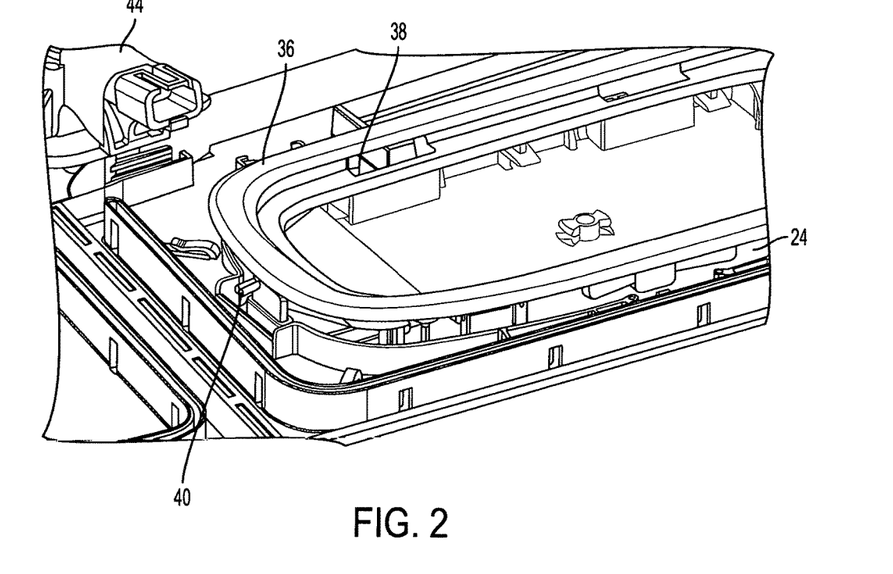
FIG. 2 shows a plan view of a visor according to the present invention.
Figure 3:
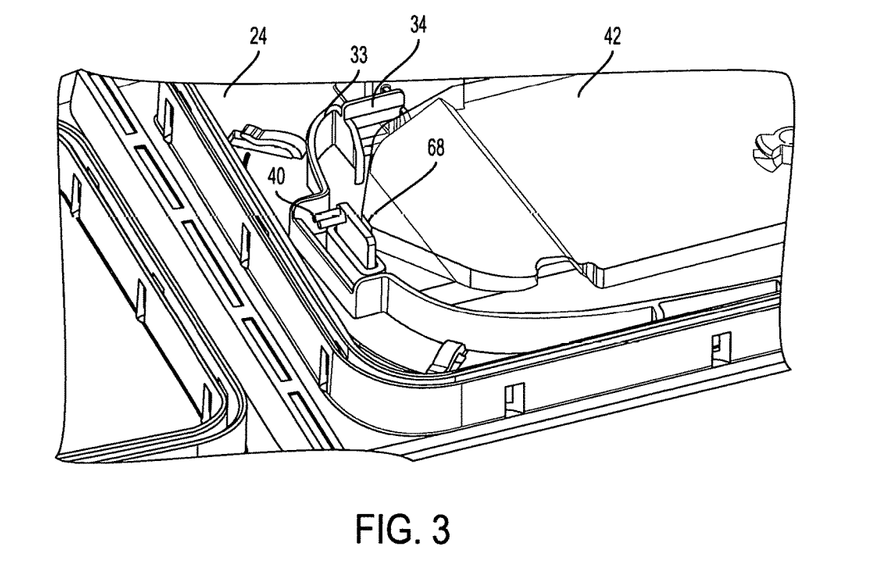
FIG. 3 shows a plan view of a visor according to the present invention.
Figure 4:
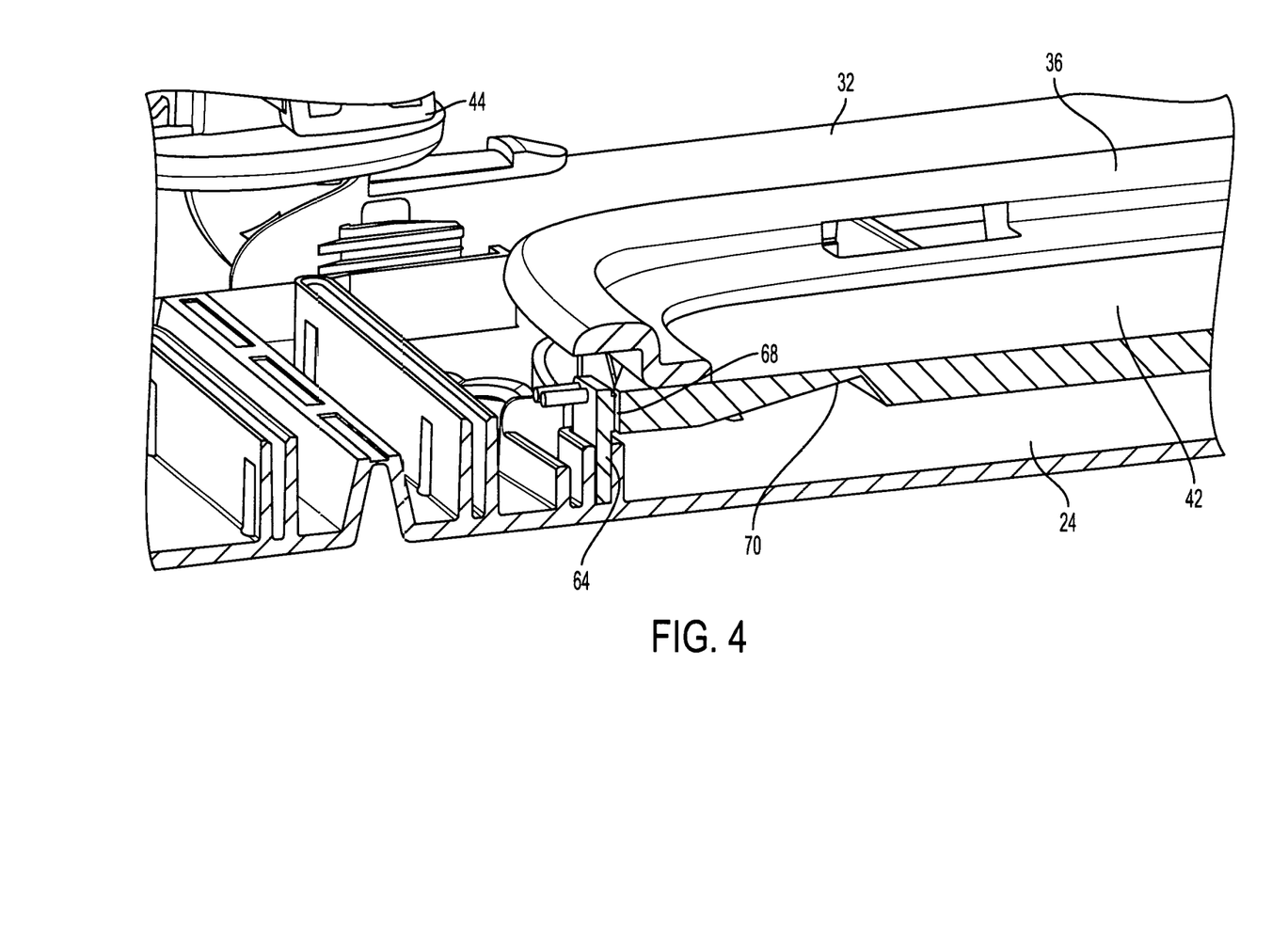
FIG. 4 shows a cross section of a visor according to the present invention.
Figure 5:
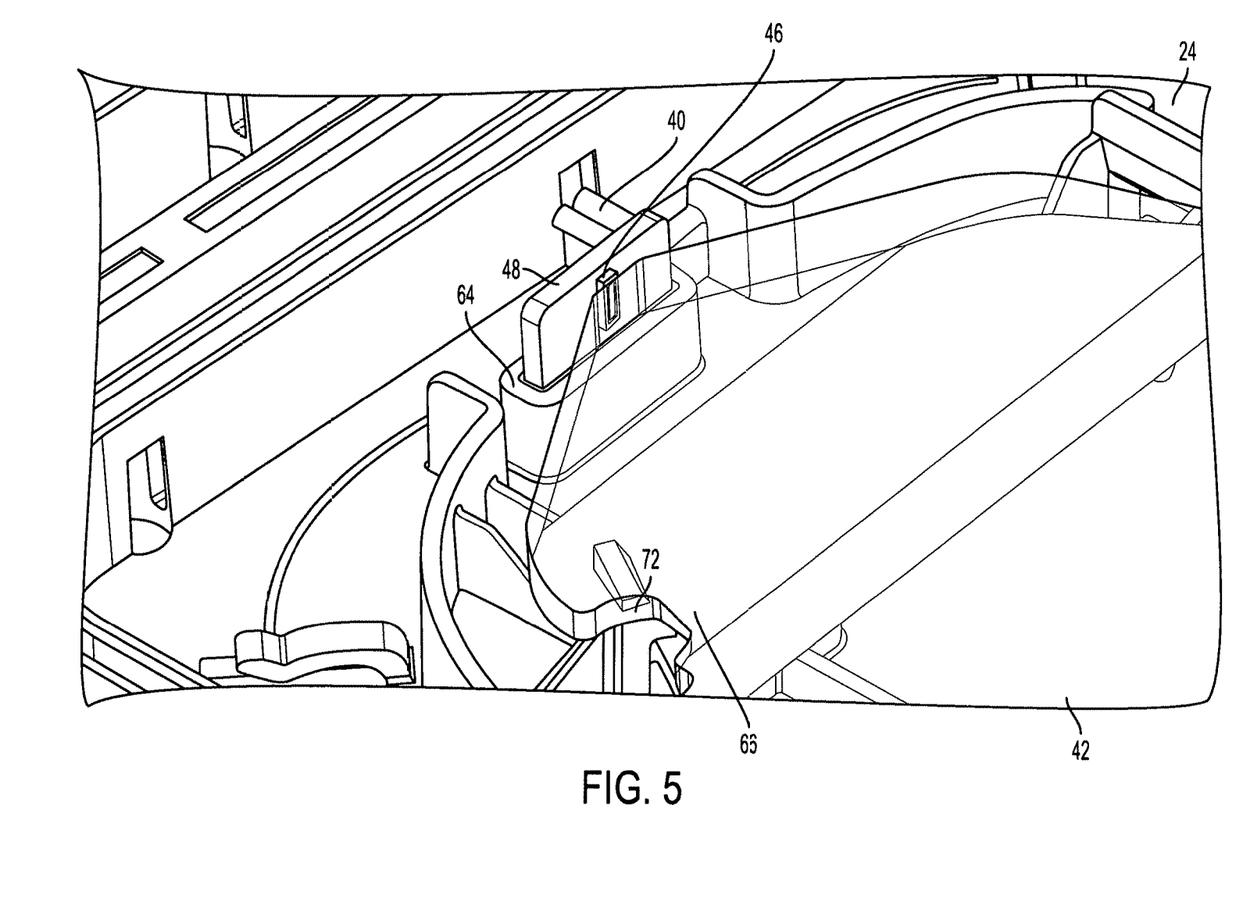
FIG. 5 shows a top view of a visor according to the present invention.
Figure 6:
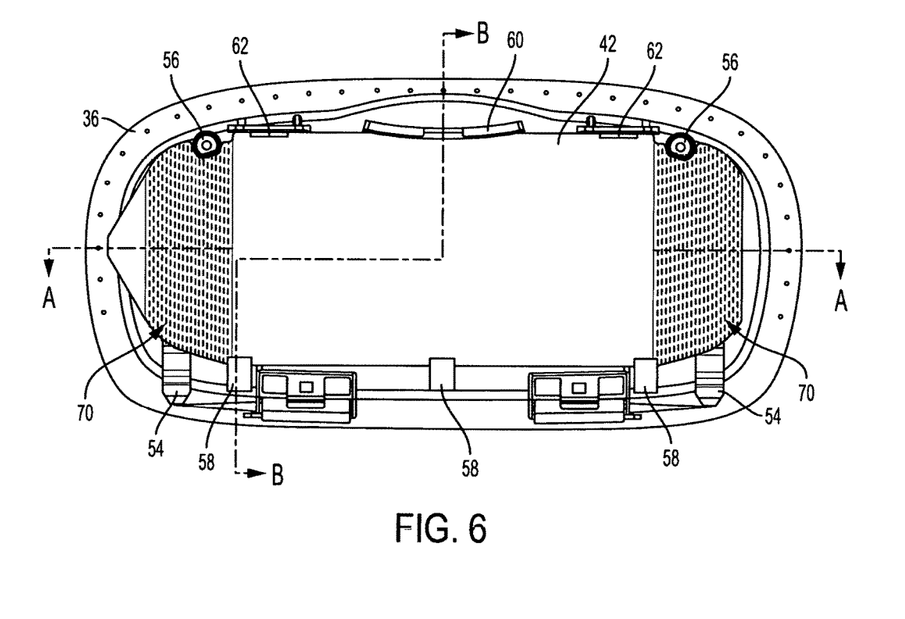
FIG. 6 shows a bottom view of a mirror of a visor attached to a vanity frame according to the present invention.
Figure 7:
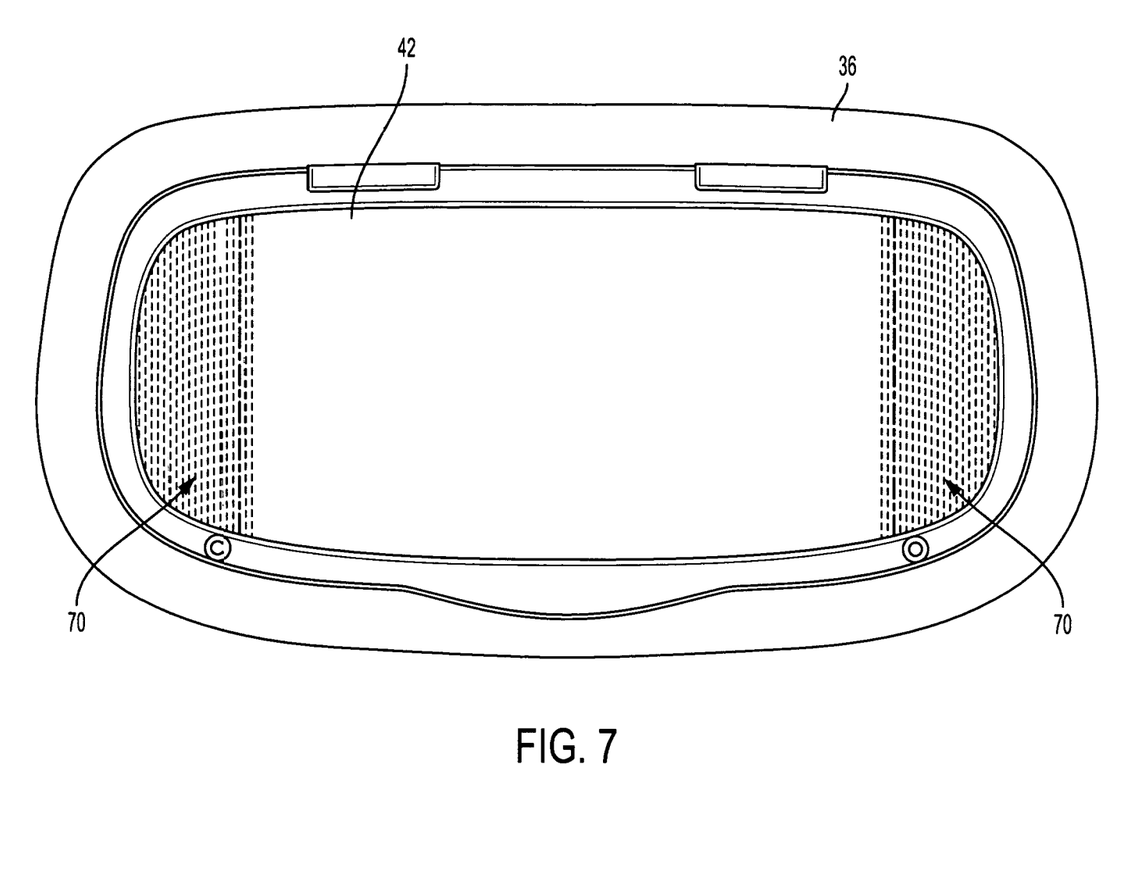
FIG. 7 shows a top view of a mirror attached to a vanity frame according to the present invention.
Figure 8:
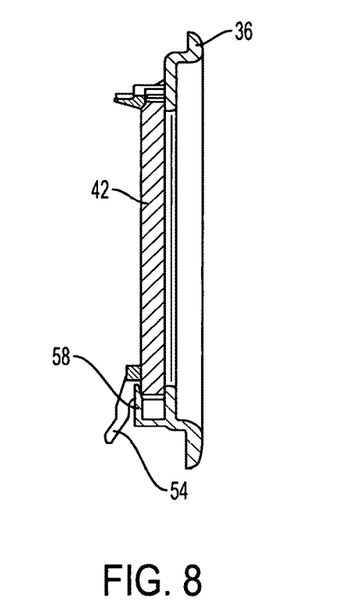
FIG. 8 shows a cross sectional view of a mirror attached to a vanity frame according to the present invention.
Figure 9:
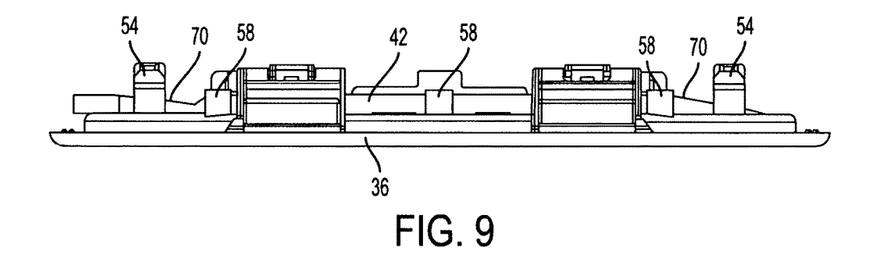
FIG. 9 shows an edge view of a mirror attached to a vanity frame according to the present invention.
Figure 10:
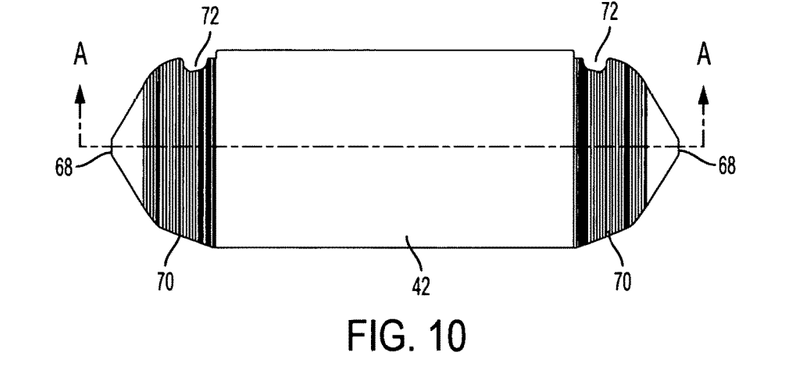
FIG. 10 shows a top view of a mirror for use in a visor according to an alternate embodiment of the present invention.
Figure 11:
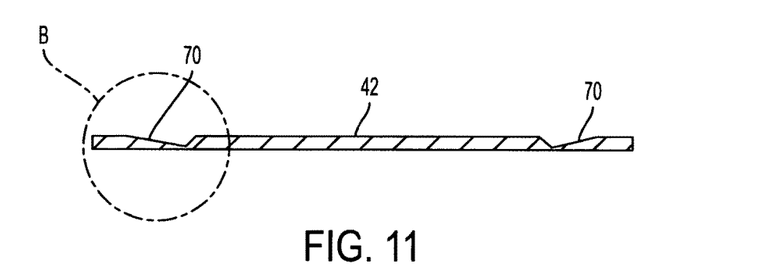
FIG. 11 shows a side view of a mirror for use in a visor according to an alternate embodiment of the present invention.
Figure 12:
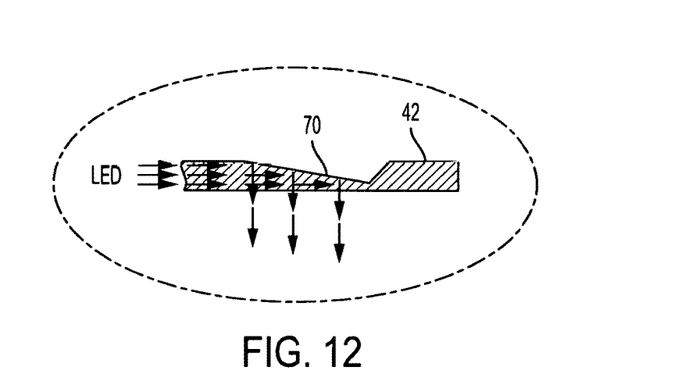
FIG. 12 shows a close up view of a ramp for use in a mirror according to an alternate embodiment of the present invention.
Figure 13:
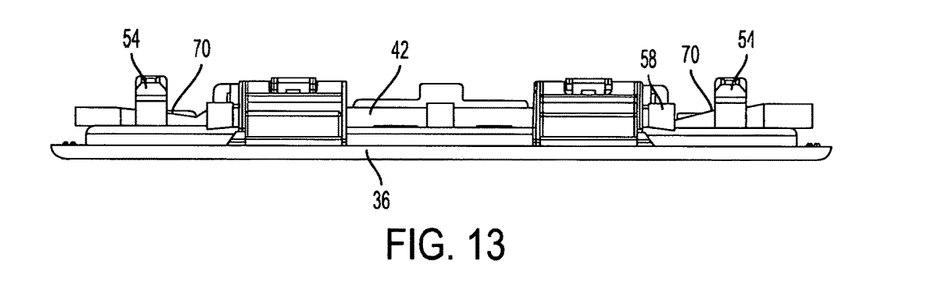
FIG. 13 shows an edge view of an alternate embodiment of a mirror secured in a vanity frame according to the present invention.
Figure 14:
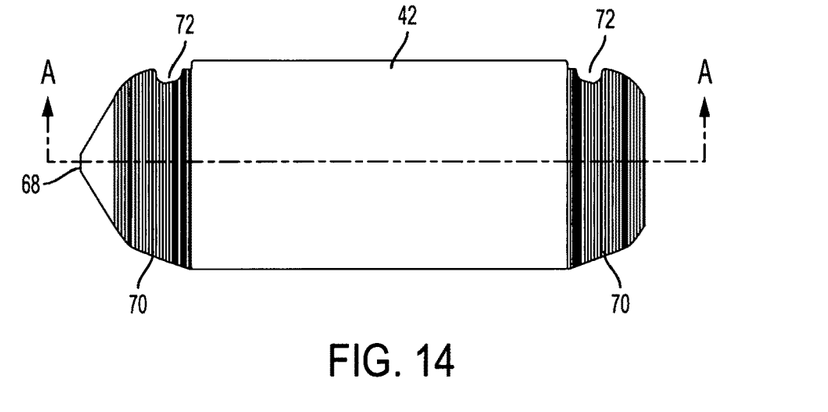
FIG. 14 shows a top view of an embodiment of a mirror for use according to the present invention.
Figure 15:
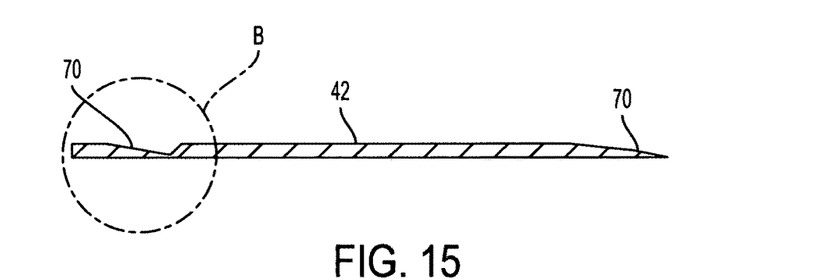
FIG. 15 shows side view of an embodiment of a mirror for use according to the present invention.
Figure 16:
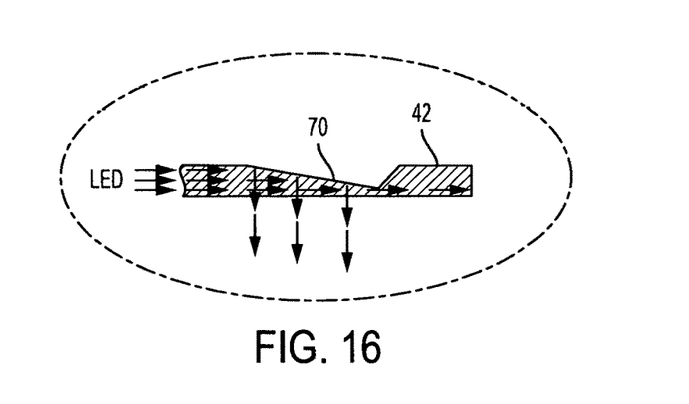
FIG. 16 shows a close up view of an embodiment of a mirror for use according to the present invention.

Referring to the drawings, there is shown a visor 20 according to an embodiment of the present invention. Generally, the present invention broadly provides a clam shell type vehicle sun visor 20 having a pivot rod 32 mounted to a carrier, wherein the pivot rod 32 and carrier are slidably captured during assembly with a single step of attaching visor shell portions together. The carrier thus rides in the visor body 22 itself rather than a separate carrier and is preferably retained between surfaces and/or features, such as channels molded integrally within the shell portions. Similarly, the pivot rod 32 rides in the visor body 22 and a separate bracket, bezel or similar piece is not necessary to support the pivot rod 32. Related aspects of the present invention include methods for manufacturing a sun visor 20 also described herein. Furthermore, it should be noted that the visor 20 as shown in the present application can be used in any known type of vehicle, such as but not limited to, automotive vehicles, maritime vehicles, aerospace vehicles, military vehicles, trains, and any other known vehicle that has a need for the sun to be blocked from filtering into the interior compartment of the vehicle. It should also be noted that generally all of the components of the visor 20, according to the present invention, may be made of a plastic material that is capable of either being extruded, molded or shaped by any known manufacturing process. However, any other known metal, ceramic, plastic, composite, natural material or any other known material may also be used for any of the parts or components of the visor 20 described herein. Furthermore, it should be noted that the visor 20 of the present invention may be any known type of visor, such as a sliding visor, a non-sliding visor, a moveable visor, or any other type of visor known in the vehicle industry.

In one embodiment shown in the Figures, the visor 20 includes first 24 and second shell halves 26 or shells which are engageable to form an elongate visor body 22. Various molded features may be included on each shell to facilitate engagement of the shells 24,26. For example, complementary structures may be formed on the respective visor shells 24,26 that allow a snap-fit therebetween. In one contemplated embodiment, the shells 24,26 may be formed having integral or connected longitudinal peripheral edges. Other embodiments are contemplated in which shells are formed as separate, unconnected members. Although connected shells are preferred, the visor as shown in the Figures may have unconnected shells also. The visor 20 further may include a pivot rod 32 that is arranged into one end of the visor body 22 and connect on the opposite end to a headliner or roof of the vehicle into which the sun visor 20 is arranged. The visor 20 is preferably formed such that the shells 24,26 may be closed about pivot rod 32 and as such capture the pivot rod 32 therebetween in a single assembly step. Also, the visor 20 may include a carrier which is slidably captured by the closure or engagement of the shells 24,26, slidably securing the carrier between the shells 24,26 without the need for installation of an internal slide member, retainer or similar mechanism for mounting the pivot rod 32. All of the components and parts of the visor 20 may be manufactured from any known material and by known processes, such as but not limited to, any type of plastic, metal, ceramic, composite, natural material or any other known material, and by any type of molding technique, forming technique, chemical and mechanical process to design and make the components as described herein.

Generally, the shells 24,26 are formed by injection molding a plastic material in a conventional manner. For example, the shells 24,26 may be formed from a molded polyethylene, or by some other suitable method and/or material. The first and second shells 24,26 generally include retaining surfaces in any known shape, such as arcuate retaining surfaces, flat or angled retaining surfaces, all of which may be elongate or trough shaped surfaces extending parallel to an edge of a visor shell and defining a portion of a cylinder or wall. It should further be appreciated that the present invention may encompass designs with retaining surfaces that vary in dimension between longer, trough-shaped features and more narrow arcuate ledges as shown. It should further be noted that an arcuate pair of surfaces may be aligned near one end of the visor shells 24,26 to allow for the pivot rod 32 to be properly supported and capable of rotating and sliding with relation to the visor body 22. The visor half shells 24,26 also may have a channel formed near one edge thereof, wherein the channel may have a first and second bearing surface. These bearing surfaces may be arranged at any known angle with relation to a center line of the visor body 22. In one contemplated embodiment, these angled surfaces may be arranged on each side of a channel that extends a predetermined distance along a longitudinal axis of the visor body 22 and these angled surfaces may be any approximate angle with relation to a center line of the visor body 22. It should be noted that these angled bearing surfaces may be arranged on each inner surface thereof. It should also be noted that the visor half shells 24,26 may include other surfaces that receive and hold various components of the sliding visor 20, such as but not limited to the pivot rod 32, a D-ring, a vanity 28, and covering material 30 arranged over the visor body 22 to complete assembly thereof.

The shell halves 24,26 that form the visor body 22 of the visor 20 according to the present invention also may include a plurality of hybrid snap and ultrasonic weld joints. In one contemplated embodiment, a plurality of profile snaps may be arranged around the front edge and the side edges of the arcuate shells of the visor shells 24,26. One of the shells may have the male portion of the profile snap while the other shell may have the female portion, which receives the male portion and holds the first shell to the second shell in order to provide a robust, zero flex interface between the two half shells 24,26 to form a robust visor body 22. These snaps, which may be arranged around the outer profile, may allow for enough flex for the front edge and side edges to allow for a tucking process to occur as described hereafter. The visor body 22 may also include at least one weld bar joint and at least one weld boss joint arranged at a predetermined position on the visor body 22. It should be noted that other contemplated methodologies and fasteners may be used to secure the two visor shell halves 24,26 to one another and it is also contemplated that the visor 20 is formed as one single body member and not of two separate shell halves.

One of the shell halves also may include a predetermined shaped orifice or cavity 32 on an outer surface thereof that may be used to receive and secure a vanity 28 to the visor body 22. The orifice or cavity 32 for receiving the vanity 28 may include a plurality of locking surfaces or locking arms 34 that may interact with locking surfaces or flanges 38 of a frame 36 of the vanity 28 to ensure the vanity 28 is secured to the outer surface of one of the shells of the visor body 22. These locking surfaces and arms 34 may take any known shape and are arranged such that both illuminated and non-illuminated visor vanities may be arranged therein. Other surfaces may also be molded into the visor half shells 24,26 to allow for placement of wires 40 to illuminate a visor vanity mirror 42 or to receive a universal garage door opener or other component directly into the visor body 22. The visor half shells 24,26 according to the present invention, may also include a plurality of teeth arranged around an outer periphery of the front edge and side edges of each of the shell halves 24,26. These teeth generally have a pyramidal or triangular like shaped tooth and may either be directly aligned with one another from each half shell or offset with one another from each half shell, depending on the design requirements and the tucking process to be used. This use of the teeth to form a tuck edge and to have the cover material placed by a tuck edge process into engagement with the teeth may create an aesthetically pleasing visor body 22 having a crisp and clean outer cover material 30 arranged thereover. It should be noted that in one contemplated embodiment the cover material 30 may be formed in the shape of a sock, wherein the sock is arranged over one end of the visor body 22 then the tuck process is used to create the clean front edge and side edges of the visor 20. However, any other known tuck process and cover material that is not in the form of a sock may also be used depending on the design requirements and the visor being created.

The visor 20, according to the present invention, may also include a D-ring secured to the visor body 22 on a top edge thereof. The D-ring may be any known D-ring. The D-ring of the present invention may partially assist in holding the cover material in a taught, clean manner over the outer surface of the visor half shells formed into a visor body 22. It should be noted that any shape may be used for the D-ring body and D-ring pin associated therewith. The visor 20 may include a pivot rod 32 which is attached at one end to a bracket or connector 44 which is secured to the headliner or roof of a vehicle. The bracket 44 may have a connector secured thereto to connect the electrical system of the vehicle via a wire 40 to the bracket 44, the wire 40 is then passed through the pivot rod 32, which generally is hollow according to the present invention. However, it should be noted that a solid pivot rod may be used, as long as it will be capable of passing electricity therethrough to allow for illumination of the vanity mirror 42 if necessary or map light. The bracket 44 may be secured to the roof of the vehicle via fasteners or any other known methodology. The bracket 44 may include an orifice that will receive one end of the pivot rod near an elbow of the pivot rod 32, wherein the pivot rod 32 generally has an angle of 60°-120° at the elbow. The pivot rod 32 may be secured and capable of rotation within the orifice of the bracket 44 and may also be swung between a front windshield of the vehicle and a side window of the vehicle to block the sun from any angle. The pivot rod 32 may be of any known length and diameter depending on the design of the visor 20 and the automobile into which it is arranged. The wire 40 may be connected between the electrical system of the automobile and a LED for illumination of a visor mirror 42 in the vanity 28. It should be noted that the visor 20, pivot rod 32 and bracket 44 may be made of any known material, such as but not limited to plastic, ceramic, composites, metals, or natural material, etc.

The visor pivot rod 32 maybe arranged within a carrier that is arranged within the visor body 22. The carrier is capable of slidable movement if the visor is a sliding visor. If the visor is not a sliding visor, the carrier is fixed with respect to the visor body 22. In the sliding visor the carrier may slide within a channel of the visor body 22 to allow for the visor 20 to be extended out towards an end of the visor rod 32 secured within the visor body 22. Any known carrier may be used to secure the pivot rod 32 to the visor body 22, such as but not limited to a floating carrier, a fixed carrier or any other known carrier associated with a visor rod 32 and visor body 22.

The visor 20 may also include a wire routing system that passes a wire 40 from the bracket 44 through the pivot rod 32 to the LED vanity light 46 for illumination of a vanity mirror 42 therein. Any known wire routing system may be used to pass the wire 40 through the visor body 22 to a circuit board 48 used to control and operate an LED 46 thereon. It should further be noted that it is also contemplated to use an onboard electric source to illuminate the LED 46 of the vanity 28 for the visor 20.

The visor 20 also may include a vanity 28. The vanity 28 generally includes a vanity frame 36, vanity door 50, door springs 52, a vanity spring, and a vanity mirror 42, with optional lights arranged thereon. The vanity frame 36 generally may include at least one, but in the embodiment shown, two connecting flanges 54 arranged near or at a bottom surface of the vanity frame 36. The opposite end of the vanity frame 36 may have arranged therein at least one locking shoulder or locking mechanism 56 that may interact with locking tabs or locking surfaces arranged on a surface of one of the visor shell halves 24,26. This may allow for the vanity frame 36 and vanity 28 to be secured to the visor body 22 without fasteners, such as screws, etc. However, it should be noted that another embodiment may use fasteners and screws to connect the vanity frame 36 to the visor body 22. One contemplated embodiment may create a snap in vanity 28. Generally, the vanity frame 36 and door 50 may have a rectangular or oval shape, however any other shaped vanity may be used depending on the design requirements of the visor 20. The vanity frame 36 may also include a hook or flex hook 58 arranged at one edge thereof and a leaf spring 60 arranged near a middle portion of an edge of the orifice defined in the middle of the vanity frame 36. Adjacent to the leaf spring 60 may be one or two locking tabs 62. This combination of the at least one flex hook 58 and in the embodiment shown three equal distantly spaced flex hooks 58 extending from the vanity frame 36, the leaf spring 60 and locking tabs 62 may be used to secure the mirror 42 to the vanity frame 36 in a flexible interface without adhesives. In operation, the mirror 42 is placed under the flex hooks 58 and then snapped under the locking tabs 62 and against the leaf spring 60 to secure the mirror 42 without adhesives to the vanity frame 36. However, it is also contemplated to secure the mirror 42 to the vanity frame 36 with adhesives or any other methodology. Hence, the vanity mirror 42, which may be of any shape, size or thickness, may be held in place to the vanity frame 36 without adhesives, which are generally used to hold a vanity mirror 42 to a frame 36 in the prior art. It should be noted that any number of leaf springs, locking tabs and/or flex hooks or flanges may be used to hold the vanity mirror 42 according to the present invention. The vanity frame 36 may be inserted into the visor body 22 by securing the first and second flange 54 arranged near a bottom edge of the vanity frame 36 underneath inboard hooks or locking surfaces that are molded into an outer surface of one of the core visor body half shells 24,26. These flanges may be arranged under these inboard hooks and then the opposite end of the vanity frame 36 may be snapped or secured into place with a downward force, such that the locking shoulders or locking surfaces of the vanity frame 36 may interact with the locking tabs, snaps or other locking surfaces molded onto and into the visor half shell 24,26 thereof. This may secure the vanity 28 into the visor body 22 with a snap in system that does not require fasteners, such as screws, to secure the vanity 28 to the visor body 22. It should be noted that the vanity 28 of the present invention may include fasteners and screws to secure it to the visor body 22.

It should be noted that the visor half shell 24,26 that holds and supports the vanity 28 also may include a circuit board pocket 64 arranged on either one or both sides of the visor half shell near the orifice through which the vanity 28 is arranged. In one contemplated embodiment shown in the figures, a rectangular shaped pocket 64 extends a predetermined distance from an inside surface of one of the visor half shells 24,26. In the embodiment shown, the circuit board pocket 64 is arranged on only one portion of the visor body half shell 24,26, however it should be noted that an identical circuit board pocket 64 may be arranged near an opposite end of the visor half shell in order to hold a circuit board 48 having an LED 46 thereon for an opposite side of the mirror 42 arranged within the vanity 28. It should further be noted that the circuit board pocket 64 may have any known shape depending on the shape and size of the visor 20, such that the pocket 64 may have any known circular, square, rectangular, triangular, or any other known or unknown shape depending on the shape and size of the circuit board 48 to be held and/or secured therein. It should be noted that the circuit board 48 generally may be secured in the pocket 64 via a press fit connection between the circuit board 48 and the inner surfaces of the circuit board pocket 64. However, any other type of mechanical or chemical fastening technique or methodology may be used to secure the circuit board 48 in a predetermined position with respect to the visor half shell 24,26 and in turn the visor mirror 42. It should further be noted that the use of other light bases, and components arranged on a visor half shell 24,26 may be used to hold the circuit board 48 for use in the present invention, such other options are disclosed in Applicant's prior filed U.S. application Ser. No. 14/996,530 filed on Jan. 15, 2016, which application is hereby incorporated by reference. The present invention may have the circuit board 48 secured and held in a predetermined position with respect to an end of the vanity mirror 42 of the present invention. It is also contemplated that the circuit board 48 may be secured or attached to the vanity frame 36. It is also contemplated that the LED 46 may be attached or secured directly to the visor body 22, the vanity frame 36 or the mirror 42. A wire 40 may be connected to the circuit board 48 on any side or end of the circuit board 48. The top side or surface of the circuit board 48 may have a LED 46 secured thereto and in electrical communication with the electronics of the circuit board 48 and the electrical system of the vehicle. The methodologies and manner of holding the circuit board 48 in a predetermined position with respect to the visor half shell 24,26 may allow for the LED 46 to be held in place in the visor 20 in such a position that it allows for light to be projected into an edge of the mirror 42 at a predetermined position in conjunction with the vanity 28. The wires 40 connected to the circuit board 48 maybe fed and arranged through any known wire channels or clips arranged on the visor half shell 24,26, such that the wire 40 may have the ability to move freely within the sliding visor while being connected to the electrical system of the vehicle.

Generally, in the prior art a lighted mirror consists of two light bulbs, one on the left and one on the right side of the mirror such that a person's face is illuminated when they look into the vanity mirror 42. One embodiment of the present invention may use LED lights 46 on both the left and right side of the vanity mirror 42, wherein the emitted light may then travel all the way across the vanity mirror 42 and come out the other side. The vanity mirror 42 of the present invention is designed such that total internal reflection occurs for light entering one end of the vanity mirror 42 such that it may cross completely across the vanity mirror 42 and come out the other side without any light being lost in either the front or back surface of the vanity mirror 42. The vanity mirror 42 may have a body with total internal reflection to transfer light from the LED 46 across the vanity mirror 42 and towards the face of the user. The present invention may eliminate the use of light guides and only require either one, two or any other number of LED's and a mirror 42 to be arranged and held within the vanity 28 of a visor 20 to allow for the mirror 42 to be a lighted vanity mirror 42 that may have light emitted by a single LED 46 to illuminate the mirror 42 and/or the person looking in the mirror in an aesthetically pleasing manner.

The present invention is capable of using either one or two LED's 46, wherein one LED 46 may be arranged near only one end of the vanity mirror 42 while the two LED 46 system may have one LED 46 arranged at one end of the vanity mirror 42 and a second LED 46 arranged at the second end of the vanity mirror 42.

The vanity mirror 42 of the present invention generally may have a rectangular or oval shape. However, it should be noted that any other known shape, such as square, round, triangular, or any other random shape may be used for the mirror 42 depending on the requirements and design aspects of the vanity 28 for use in the visor 20 of the vehicle. The vanity mirror 42 may have any known length, width and thickness. In one contemplated embodiment, the mirror 42 is approximately six and one half inches in length and two and one half inches in width and approximately 0.2 inches or approximately five millimeters thick. The body of the vanity mirror 42 may have any other dimensions other than those described above from approximately one inch in length to many feet in length and from approximately one half inch in width up to many feet in width and from approximately two millimeters to many centimeters in thickness depending on the use for the mirror 42. It should be noted that in one contemplated embodiment the mirror 42 is made of any known acrylic or polycarbonate clear plastic. However, it should be noted that any other known plastic, ceramic, composite, natural material or metal may be used to form the mirror body 42. The body of the vanity mirror 42 may have an LED or other light source 46 arranged at an end of the mirror 42 wherein the LED 46 emitted light may be totally internally reflected across the entire length of the mirror 42 from one end to the opposite end, thus exiting at the opposite end of the vanity mirror 42. It should be noted that in one contemplated embodiment the vanity mirror 42 maybe made of a generally clear material while the back side or surface of the vanity mirror 42 may have a reflective material arranged or placed thereon such as a reflective metal like aluminum or silver, etc. However, it should be noted that the body of the mirror 42 may also have the front surface mirrored with a reflective material instead of the back surface depending on the design requirements and the use of the mirror 42. If the reflective material is on the front of the mirror 42, then it must not cover the light emitting areas 66. It should be noted that generally arranged at or near each end of the vanity mirror 42 may be a light emitting section or stripe 66. The light emitting portion generally maybe defined as a portion of the mirror 42 that does not have a reflective coating, tape or mirrored surface thereon. The light emitting section 66 appears to be clear to the user of the mirror 42. In one contemplated embodiment the light emitting portion 66 or stripe 66 may be aligned vertically across the entire width of the mirror 42 wherein this light emitting portion 66 may allow for light to be projected from within the vanity mirror body towards the face of the user of the vanity mirror 42. It is also contemplated that the light emitting portion 66 may be arranged on the mirror 42 in any known orientation or position not just vertically as shown. It should be noted that these light emitting portions 66 may be arranged directly at each end of the vanity mirror 42 or arranged a predetermined distance away from each end of the vanity mirror 42 and it is also contemplated to have only one light emitting portion 66 arranged at a predetermined position on the surface of the vanity mirror body. It should be noted that in one contemplated embodiment the vanity mirror light emitting portions 66 generally have a rectangular shape, however any other known shape, such as but not limited to oval, square, circular, triangular, or any other known or random shape may be used to define the light emitting portions or stripes 66 for the vanity mirror body of the present invention. The vanity mirror body of the present invention may have the mirrored portion on either the back surface of the vanity mirror 42 or the top surface of the vanity mirror 42 according to the present invention. It should further be noted that it is contemplated to paint, coat or apply a tape or other material to the back surface of the light emitting portions 66 of the vanity mirror 42 a predetermined color to allow for an aesthetically pleasing look for the mirror 42 when used by the vanity mirror user. It is contemplated that a white color or any other neutral light color or a dark color may be used to coat the back surface of the light emitting portion 66 of the vanity mirror 42. However, it is also contemplated that the color of the visor half shell 24,26 may be predetermined to allow for an aesthetically pleasing look to the user when the vanity mirror 42 is not illuminated. It is also contemplated that instead of using white some sort of reflective coating may also be placed on the back surface aligned with the light emitting portions 66 of the vanity mirror 42. The thickness of the vanity mirror 42 may be determined upon the use of the vanity mirror 42 within the visor 20. It should be noted that generally the mirror 42 is planer and includes one or more edges which are suitable for placement of a light source 46, preferably in the present invention an LED light source. This may allow the edge of the end of the vanity mirror 42 to facilitate lateral injection of light into the mirror body at approximately the same plane as the mirror 42. In one contemplated embodiment, the light injection end may have an edge that is smooth and flat, however it is also contemplated to include refracted optical features in order to initiate wider light dispersion or narrower light dispersion, still within the plane of the vanity mirror 42. It should further be noted that in one contemplated embodiment the front surface of the mirror may be completely smooth such that dirt and dust are easy to clean off and does not get caught on any rough surfaces. In one contemplated embodiment, an LED or other light source 46 is placed at the light injection edge 68 located on at least one or maybe both ends of the mirror 42, such that the light may enter the mirror 42 and travel directly across the mirror 42 via total internal reflection. The light source, such as an LED 46, in the mirror 42 may be placed within the visor body 22 such that stray light from the LED 46 may not produced unwanted glare and such that the light source 46 stays in close proximity to the light injection edge 68 of the visor vanity mirror 42.

The vanity mirror 42 of the present invention may also include one or more ramps or channels 70 cut, molded, injection molded or machined into the back surface of the vanity mirror 42. The ramps 70 may disrupt the total internal reflection of the mirror 42 in the vicinity of the ramp 70 thus allowing for light to be distributed out the front of the mirror 42 at this location to illuminate the vanity mirror 42 and the user's face. It should be noted that other optical features capable of disrupting the total internal reflection of the mirror 42 may also be used such as but not limited to bonding a light guide film on the light emitting area 66, etc. In one contemplated embodiment, a first ramp 70 is located at or near a first end of the vanity mirror 42 and a second ramp 70 is located at or near a second end of the vanity mirror 42. It should be noted that the ramps 70 generally align with and define the light emitting portions 66 arranged on the vanity mirror 42. The ramps 70 create a disruption in the total internal reflection of the vanity mirror body and thus evenly illuminate the user of the vanity mirror 42. The ramps 70 of the present invention generally are large and extend a predetermined distance into the back surface of the mirror 42 so as to capture a high percentage of the light emitted from the light emitting diode 96 such that not much light may be wasted by traveling all the way across the mirror 42 and out the edges of the vanity mirror 42. Any light that is lost out of the edges of the vanity mirror 42 is wasted light in the application of an illuminated vanity mirror 42. In one embodiment contemplated a LED 46 is arranged on each end and at each edge of the vanity mirror 42 and a first and second ramp 70 may be arranged near each end of the vanity mirror 42 into a back surface thereof. It should be noted that the first and second ramp 70 may each include a first inward extending surface extending at a predetermined angle from the back surface of the mirror 42. Each ramp 70 may also include a second inward extending surface extending at a predetermined angle from the back surface of the mirror 42. It should be noted that the two surfaces may meet at a predetermined depth within the thickness of the vanity mirror 42. In the embodiment shown the mirror thickness is approximately 0.118 inches and the ramp 70 extends into the back surface of the mirror 42 0.078 inches thus it extends deeply into the mirror 42 to allow for almost complete redirection of the light being emitted from the LED 46 towards the face of the user of the vanity mirror 42. In this case, the first or longer surface of the ramp 70 may be arranged closest to the end of the vanity mirror 42 with a LED 46 thereby thus allowing for near complete redirection of the total internal reflection (TIR) light towards the user of the vanity mirror 42. Any light that escapes beyond the ramp 70 would directly travel across the vanity mirror 42 to the other ramp 70. It should be noted that as described above, the back surface of the mirror 42 has the ramps 70 arranged directly adjacent to and aligned with the light emitting portions 66. As noted above, the ramp 70 may be painted white or any other desired color to improve the aesthetics of the mirror 42 when the LED's are turned off. It should further be noted that ripples, ridges or any other features may be arranged, machined and/or molded directly onto the surface of the ramps 70. These surfaces, ripples or ridges may be well defined and may improve the aesthetics as well as make the light output somewhat less sensitive to changes in the surface roughness of the ramps 70 arranged within the back surface of the vanity mirror 42. It should be noted that the angle at which the first and second inward extending surfaces enter the back surface of the mirror 42 may be in the approximate range of zero to ninety degrees with relation to the back surface of the mirror 42. It should be noted that the angle may be determined based on the design and the amount of light to be redirected towards the user of the vanity mirror 42.

In an embodiment, it is contemplated to use one LED 46 instead of two to provide light from a first and second light emitting portion 66 as shown in the figures of the present invention. It should be noted that for the dual LED embodiment each side had ramps 70 that were made with the long gentle side of the ramp 70 facing the LED 46. These ramps 70 were cut deeply into the mirror body 42 so that a minimum amount of light would transit over the top of the ramp 70 and travel to the ramp 70 on the opposite side of the vanity mirror 42. In the embodiment that uses only one LED 46 to provide light to both sides of the vanity mirror 42, the ramp 70 on the side that includes the LED 46 arranged at the end thereof would be cut much less deeply into the vanity mirror back surface. In one contemplated embodiment, if a mirror thickness is approximately 4.5 millimeters the first ramp 70 would be arranged at a depth of approximately two millimeters into the back surface of the vanity mirror 42 while approximately 2.5 millimeters of the mirror body material would still be intact above the top of the first ramp 70. In this case, approximately one half of the light from the LED 46 may transit past the first ramp 70, thus traveling by TIR all the way across the mirror 42 to the opposite side of the mirror 42 and the second ramp 70 arranged on the opposite end of the mirror 42 which may be cut in the same or opposite direction as the first ramp 70 on the first end of the mirror 42. The second ramp 70 maybe arranged almost or all of the way through or into the thickness of the mirror's back surface in order to maximize the amount of light which is redirected from the second ramp 70 through the back clear portion 66 towards the user of the vanity mirror. Furthermore, this would only allow a small percentage of light to be wasted as it traverses past the second ramp 70. In this embodiment, the user may perceive equal illumination from both sides while only using one LED 46. Therefore, the ramps 70 may or may not face and be aligned in the same direction when one LED 46 is used to illuminate both sides of a vanity mirror 42. The LED 46 may have the same configuration as those described above for the two LED embodiments. Therefore, in the single LED 46 embodiment approximately half of the light may be directed from each end or side of the mirror 42 towards the face of the user of the vanity mirror 42. It should be noted that the dimensions given are just one contemplated embodiment and that any other dimensions and depth of either the first or second ramp may be used. Generally, the second ramp 70 may extend more deeply into the back surface of the vanity mirror 42 than the first ramp 70 in order to allow for the light to be redirected through both ends of the vanity mirror light emitting portions 66 arranged on each end of the vanity mirror 42. It should be noted that a split of the light other than 50/50 on each side or end of the mirror may also be used and may easily be altered by varying the depth of the first ramp 70. The use of a single LED 46 may allow for the entire vanity mirror 42 length to be shortened which may reduce the cost of the vanity mirror 42. It is also contemplated that by increasing the angle of the transition area on the end of the vanity mirror 42 that has the LED 46 arranged thereby from an included angle of approximately forty eight degrees to an included angle of approximately one hundred twenty degrees may have little or no loss of performance since the LED 46 generally has a beam spread angle of approximately one hundred twenty degrees. It should be noted that in the one LED embodiment the end of the mirror 42 that may have the light emitted diode 46 arranged thereby may have a generally a triangular shape when viewed from a back of the mirror 42. The light entry point 68 may have a flat smooth surface however any other concave surface may be used depending on the LED 46. It should be noted that one end of the generally triangular shape and may start at an edge of a ramp 70. It should further be noted that any other shape may be used for the end of the mirror 42 that may receive the light therein and that any known included angle from approximately twenty to one hundred ninety degrees may be used depending on the LED 46 used in conjunction therewith. It should further be noted that the vanity mirror 42 may also include a first and second notch 72 arranged generally near or at a first and second end on an edge thereof. The notches 72 may be used to help secure the vanity mirror 42 within the vanity frame 36 near the first and second locking shoulders 56 of the vanity frame 36. It should be noted that generally the notches 72 have a semi-circular shape but the shape may be any shape that corresponds to the locking surfaces arranged from the vanity frame 36. The use of these notches 72 may help to secure the vanity mirror 42 in a predetermined position with relation to the vanity frame 36 and hence, the visor body 22. Generally, the ramps 70 when viewed from a side form a wedge like shape into the back surface of the vanity mirror 42 unless the ramp 70 is arranged directly at the end of the mirror 42 then the ramp 70 may form a generally angled end in the back surface of the vanity mirror 42. The mirror 42 may have a coating or film on the outer visible surface thereof to reduce or eliminate scratching of the outer visible surface of the mirror 42. This scratch mitigating feature may or may not be used on the mirror 42.

It should be noted that the light emitting diode 46 arranged on the circuit board 48 of the present invention may emit light directly into either one or two of the mirror body edges and have that light travel across the plane of the mirror 42 via total internal reflection. The design may allow for the emitted light to be redirected via ramps 70 arranged in predetermined positions in the back surface of the vanity mirror 42 which may disrupt the total internal reflection and allow for the light to be scattered and emitted through the light emitting portions 66 of the vanity mirror 42 toward the user of the vanity mirror 42. The ramps 70 arranged within the visor vanity mirror body may allow for the total internal reflection of the mirror body to be disrupted and allow for a high percentage of the light to be captured and redirected if a two LED system is used or for almost all of the light to be captured and evenly divided between the left and right side of a vanity mirror 42 if a one LED 46 system is used thus providing for an aesthetically pleasing and consistent illumination of the user's face. Therefore, the vanity mirror 42 of the present invention may use either one or two LED 46 and with the LED being very small and inexpensive to manufacture less wiring may be required. The use of the ramps 70 arranged directly in the vanity mirror body may cause a high percentage of the light to be redirected in the direction of the target, such that not much light from the LED's may be wasted as stray light within the visor body 22. The use of one or two individual LED's 46 may be sufficient to illuminate the user of the vanity at the customer's specified light levels of approximately sixteen lux. The use of the ramps 70 as a TIR disruption feature may be inexpensive to produce since they can be molded, cut or machined directly into the back surface of the mirrors 42. Furthermore, the mirroring and illumination of the mirror 42 may be done in large sheets for easier manufacturing of the vanity mirror 42 for the manufacturer. It should further be noted that with the present invention the light directed toward the user's face may be diffuse and pleasing with a minimum amount of glare such that no intense bright spots may be evident in the case of looking right at the LED 46 which may be too blinding to be practical in an illuminated visor mirror. With the mirror 42 being smooth on the front side including the areas where the light is released from may allow for illumination of the mirror and the user's face while looking at the mirror 42. The use of the vanity mirror 42 as described herein may reduce the number of parts needed to create the illuminated sliding visor according to the present invention. A single mirror 42 and as little as one LED light source 46 may be used to illuminate a mirror 42 instead of some prior art visors that use two light bulbs, two light bulb sockets, the associated wiring, the associated lens covers, along with associated light guides for each end thereof. It should further be noted that the ramps 70 of the present invention generally extend across the entire width of the backside of the vanity mirror 42. However, it should be noted that it is also contemplated that only a predetermined portion of the width of the vanity mirror 42 may have the ramp 70 arranged thereon depending on how the light is to be projected towards the user's face of the vanity mirror 42. It should further be noted that more than two ramps 70 may be used in the contemplated embodiment of the vanity mirror 42 and as little as one ramp 70 may also be used in another contemplated embodiment of the vanity mirror 42 according to the present invention. Furthermore, the depth at which the ramps 70 extend into the back surface of the mirror 42 may be any known depth depending on the amount of light needed to be redirected towards the user of the interface at any number of predetermined light emitting portions 66 arranged in the surface of the mirror body.

Therefore, in operation, the embodiments of the visor 20 described herein may be easier to manufacture and easier to have the vanities installed therein, via a snap in locking system deployed in both the frameless vanity and the locking vanity frame embodiments disclosed. Such easy installation of the vanities and easy use of the LED 46 to illuminate such vanities within the visor bodies may reduce manufacturing time and reduce the overall costs and number of parts for the manufacturer while also allowing the reduction in costs and materials as the clear ends 66 of the mirror 42 allow for a removal of any lenses and associated hardware connected to the lenses and/or light guides that may be used in conjunction with a LED 46 in the prior art.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A visor for use in a vehicle, said visor comprising:
   a pivot rod;
   a first and second shell being engageable to form a visor body;

a vanity;

a mirror having at least one light emitting portion arranged at or near an end thereof, said mirror having total internal reflection;

a circuit board secured to said first shell;

a light emitting diode connected to said circuit board; and a ramp arranged in a back surface of said mirror, said ramp aligned with said at least one light emitting portion of said mirror.

2. The visor of claim 1 wherein said mirror is secured to a vanity frame of said vanity.

3. The visor of claim 2 wherein said vanity frame having an inward extending flange, said flange engages said back surface of said mirror.

4. The visor of claim 2 wherein said vanity frame having a spring, said spring engages said mirror.

5. The visor of claim 1 wherein said mirror having a second ramp arranged in said back surface thereof near or at another end of said mirror.

6. The visor of claim 1 wherein said mirror having a generally triangular shape at said end, said end having a predetermined included angle.

7. The visor of claim 1 wherein said ramp having a first inward extending surface with a predetermined angle from said back surface.

8. The visor of claim 7 wherein said first inward extending surface extends a first distance into said back surface of said mirror.

9. The visor of claim 8 wherein said ramp having a second inward extending surface with a predetermined angle from said back surface, said second inward extending surface and said first inward extending surface meet at said first distance of said back surface of said mirror.

10. The visor of claim 1 wherein said ramp having a smooth, rippled or ridged surface.

11. The visor of claim 1 wherein said ramp having a predetermined color.

12. The visor of claim 5 wherein said second ramp having a first inward extending surface with a predetermined angle from said back surface, said first inward extending surface extends a second distance into said back surface of said mirror.

13. The visor of claim 12 wherein said second ramp having a second inward extending surface with a predetermined angle from said back surface, said first inward extending surface and said second inward extending surface meet at said second distance.

14. The visor of claim 1 wherein said ramp redirects a predetermined amount of light emitting from said light emitting diode through a front surface of said mirror at said light emitting portion thereof.

15. The visor of claim 11 further comprising a second light emitting diode arranged near a second end of said mirror.

16. The visor of claim 1 wherein said light emitting diode is arranged near said end of said mirror.

17. The visor of claim 1 wherein said ramp extends between a generally top and bottom edge of said mirror.

18. The visor of claim 1 wherein said light emitting diode is secured directly on a surface of said circuit board.

19. The visor of claim 11 wherein said predetermined color is white.

20. The visor of claim 1 wherein said mirror having a second light emitting portion.

* * * * *